Feb. 6, 1962      D. L. STINSON      3,019,486

METHOD OF MAKING PLASTIC HINGE

Filed Dec. 20, 1957      2 Sheets-Sheet 1

INVENTOR.
D. L. STINSON

BY Hudson and Young

ATTORNEYS

3,019,486
METHOD OF MAKING PLASTIC HINGE
Donald L. Stinson, Bartlesville, Okla., assignor to Phillips Petroleum Company, a corporation of Delaware
Filed Dec. 20, 1957, Ser. No. 704,037
3 Claims. (Cl. 18—48)

This invention relates to novel plastic hinges. In one aspect this invention relates to a novel hinge formed from semirigid solid plastic materials such as solid polyethylene. In another aspect this invention relates to a method for making a flexible hinge from solid polyethylene.

The use of semirigid solid plastic materials such as solid polyethylene is increasing in the manufacture of articles where light weight, electrical resistance, corrosion resistance and other characteristics of these materials is desirable or required. One obstacle which acts as a determent to the use of these materials in all applications is their apparent lack of flexibility so that it has been necessary to substitute other and more flexible materials where flexibility is required.

It is, therefore, a principal object of this invention to provide a method for imparting a measure of flexibility to semirigid solid plastics such as polyethylene. It is also an object of this invention to provide a flexible hinge made of a semirigid material such as polyethylene. Oher objects and advantages of this invention will be apparent to one skilled in the art upon studying the present disclosure, including the detailed description and the appended drawing.

The invention is based on the discovery that when a sheet of semirigid plastic material such as solid polyethylene is bent along a line and is flexed several times along the line a measure of flexibility is acquired without substantial, if any, loss of tensile strength at the stress point. This flexing appears to reorient the plastic material to produce a necked-down cross section which is 75 to 90 percent of the original cross section. The stresses on the plastic material during the flexing operation are believed to effect a fibrous section affording good-flex life. A ⅛ inch sheet will be necked-down from both sides to leave a cross section approximately 1/10 of an inch in thickness with the necked-down length being ⅛ to ¼ of an inch.

Figure 1:
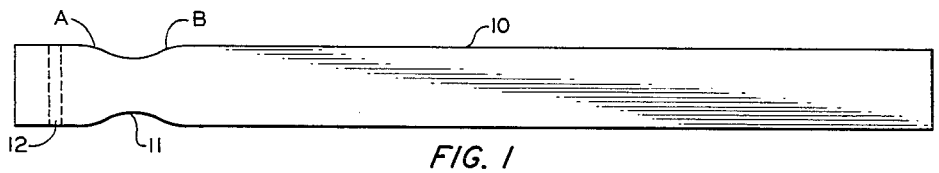
Figure 5:
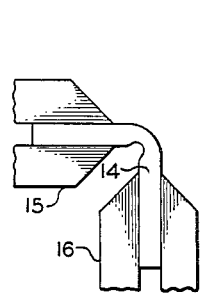
Figure 6:
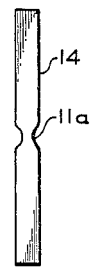
Figure 8:
Figure 10:
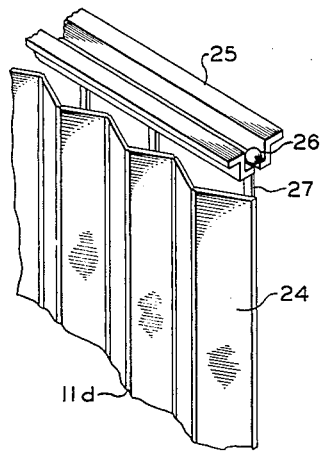
Figure 7:
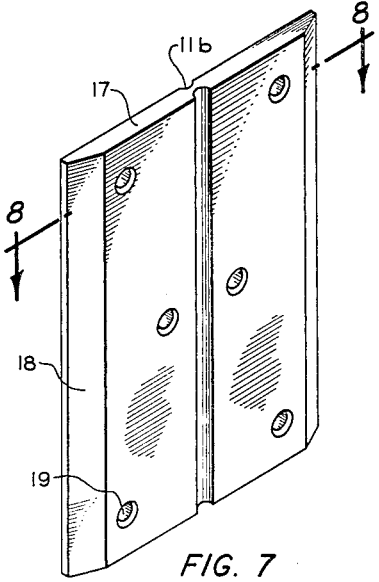
Figure 9:
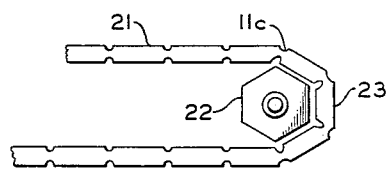
Figure 11:
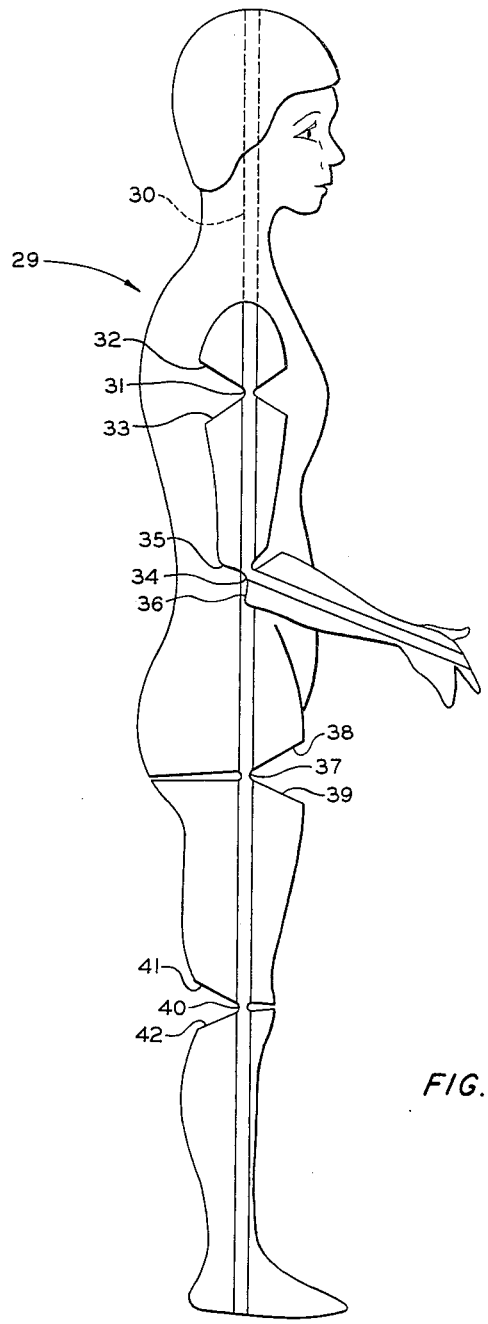

FIGURE 1 provides an illustration of the invention as applied to a book cover,

FIGURES 2, 3, 4, 5, and 6 illustrate the steps utilized in constructing a hinge according to the invention, FIGURE 7 illustrates a modification of the invention, FIGURE 8 is a view of FIGURE 7 along lines 8—8, FIGURE 9 shows a further modification of the invention, FIGURE 10 shows another modification of the invention, and FIGURE 11 shows still another modification of the hinge of this invention.

Referring now to the drawing, FIGURE 1 shows a cover for a large loose-leaf book indicated at 10 with necked-down portion 11 comprising the hinge and binding post hold 12 for securing cover 10 to a second cover (not shown). The hinge comprises the necked-down portion from A to B.

Figure 2:
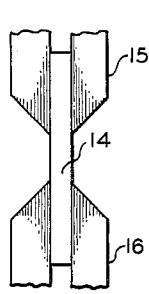
Figure 3:
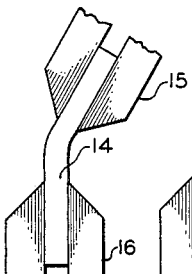
Figure 4:

FIGURES 2 to 6 shows the steps in forming a hinge, as illustrated in FIGURE 1, wherein a strip of plastic material, such as polyethylene, indicated at 14 in FIGURE 2 is grasped by vises 15 and 16 adjacent the portion to be made flexible to form the hinge and is flexed to the right and to the left through an arc of 180 degrees in both directions along the line which forms the axis of the hinge. These steps are shown in FIGURES 3, 4 and 5 and the completed hinge is shown in FIGURE 6 with the locus of the hinge being indicated at 11a.

FIGURE 7 illustrates a hinge made of polyethylene for use in applications such as a cabinet door or a screen door. Hinge 17 preferably has a beveled edge 18 to prevent stress cracking of highly crystalline plastic materials which are subject to stress cracking at sharp corners. Perforations 19 are preferably recessed to provide a flush surface when bolts or screws are utilized for securing the hinge. The hinge portion is illustrated at 11b.

FIGURE 9 shows an embodiment of the invention wherein polyethylene is employed as a conveyor belt constructed of an endless series of semirigid polyethylene sections 23 joined together by the hinges indicated at 11c. The belt travels over a pulley 22 which is adapted to provide a flat surface for each rigid section. The conveyor belt 21 is fabricated from a strip of semirigid polyethylene which is "stretched flexed" at spaced intervals to provide the rigid sections 23 and the necked-down flexible sections 11c. After the flexible hinged sections 11c have been formed the two ends of the strip can be welded by conventional means to form an endless belt. This conveyor belt has particular utility in food processing and food packaging machinery because no lubrication is required, because the belt can be sterilized and further because the polyethylene is non-toxic. The belting material can be made in a continuous form on a machine that grips and flexes sections of the strip at regularly spaced intervals.

FIGURE 10 shows a modification of the invention wherein a semirigid material such as polyethylene is used for the fabrication of flexible folding partitions for use in dwelling houses, offices and public buildings. The partition or screen of FIGURE 10 is comprised of rigid sections 24 and vertical hinged sections 11d. Track 25 is secured to the ceiling and carries trucks 26 which are secured to the partition by means of supports 27. The track 25 and trucks 26 are conventional.

FIGURE 11 shows a modification of the invention wherein a doll indicated at 29 constructed of foam rubber, for example, is supported upon a strip of semirigid polyethylene indicated at 30 and has a necked-down hinge formed at 31 to provide a shoulder joint and cut-away sections of the foam rubber indicated at 32 and 33 to allow movement of the shoulder joint. A hinge is formed at 34 to provide an elbow joint and cut-away sections 35 and 36 are provided in the foam rubber portion of the arm to allow movement of the elbow joint. A hinge is provided at 37 to provide a hip joint and cut-away sections 38 and 39 are provided in the thigh section of the doll body to allow movement of the hip joint. A hinge 40 is provided to provide a knee joint and cut-away sections 41 and 42 of the leg allow movement of the knee joint. Additional hinges are provided to impart additional flexibility to the doll structure, for example, at the ankles, wrists, fingers and neck. Although the doll body is indicated as being made of foam rubber, it is obvious that other materials such as plastics, wood and the like can be utilized, foam rubber being exemplary.

The present invention is broadly applicable to semirigid plastic materials including polyethylene, polyvinyl chloride, polytetrafluoroethylene, and the like. Particularly applicable for use in the present invention is a polymer of ethylene or other 1-olefins prepared according to the copending patent application of J. P. Hogan et al., Serial Number 573,877, filed March 26, 1956, now U.S. Patent 2,825,721. As set forth in that copending application in more detail unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. One satisfactory method for producing the catalyst comprises the use of a steam-aged commercial cracking catalyst comprising a coprecipitated gel containing approximately 90 weight percent silica and 10 weight percent alumina. Such gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of about 450 to about 1500° F., preferably from about 900 to about 1000° F., for example, with a stream of substantially anhydrous oxygen-containing gas, such as air. The olefin feed used for polymerization is at least one olefin selected from the class of 1-olefins having a maximum chain length of 8 carbon atoms and no branching nearer the double bond than the 4-position. Examples of such olefins are ethylene, propylene, 1-butene, and 1-pentene. Copolymers, such as ethylene-propylene copolymers, can be prepared by the described method. The polymerization can be effected at a temperature in the range of 150 to 450° F. The pressure can range from approximately atmospheric to as high as 1000 p.s.i.

A satisfactory method of conducting the polymerization comprises contacting an olefin with a slurry of catalyst in a hydrocarbon solvent which can exist as a liquid at the temperature of polymerization. In such a case, reaction pressure need be only sufficient to maintain the solvent substantially in the liquid phase and will ordinarily range from about 100 to about 700 p.s.i.

Suitable solvents for use in the above-described process are hydrocarbons which are liquid and chemically inert under the reaction conditions. Solvents which can be used advantageously include paraffins, such as those having 3–12 and preferably 5–9 carbon atoms per molecule, for example, 2,2,4-trimethylpentane (isooctane), normal hexane, normal decane, isopentane, and the like. Another class of solvents which can be used are napthenic hydrocarbons having from 5 to 6 carbon atoms in the naphthenic ring, and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethylcyclopentanes, the methyl propylcyclohexanes, and the ethylpropylcyclohexanes.

The following examples of the invention will be helpful in understanding the invention but are not to be construed as limiting the invention.

*Example I*

Solid ethylene polymers were produced by contacting a mixture of ethylene and cyclohexane with a finely divided catalyst comprising chromium oxide, supported on silica-alumina, which was maintained as a slurry in the liquid at a temperature in the range of 290 to 300° F. and a pressure of about 450 p.s.i.g. The catalysts were prepared by impregnating a 90–10 silica-alumina coprecipitated gel composition with an aqueous solution of chromium trioxide, drying and heating for several hours in a steam of anhydrous air at about 950° F. The particle size of the finished catalyst was from 40 to 100 mesh. Ethylene was separated from the reactor effluent and returned to the reaction chamber and the ethylene-free effluent stream was treated for removal of catalyst and recovery of solid polymer.

Solid polyethylene strips were prepared from the polyethylene ½ inch wide and 0.045 inch thick. Hinges were made in the strips according to the procedure illustrated in FIGURES 2 through 5 of the drawings and it was estimated that the hinge necked-down to about 0.01 inch. A hinge prepared as above was secured to two wood blocks and was flexed through 180 degrees. The hinge was flexed through approximately 70,000 cycles before it failed.

Similar hinges prepared from commercially available solid polyethylene, when used in the flexing tests, were found to provide satisfactory results.

The hinge of present invention is applicable for many uses, including the covers and bindings for books, especially large books, such as public telephone books, dictionaries, bound legal volumes and the like. Hinges for cabinet doors and similar uses can be supplied in lengths and cut to size as desired and secured in place with nails, screws or bolts. The hinge of the invention finds application in the field of toys where flexible attachments are needed as hinges for doors and lids on toy houses, cars, and the like, where askew but small loads can be tolerated. The hinge is also applicable for arm and leg attachments in dolls and toy animals.

Other uses for such a flex joint is in shoe welts and arch supports, in weather seals in revolving doors, and flexible joints in air conditioning ducts and in diaphragms for valves where multiple plies are used. Sheets containing a plurality of hinge portions can be used where accordion-type folds are required, such as the flexible weather housings that are used in the passage-way over railroad car couplings, and for flexible folding partitions in houses.

Reasonable variations and modifications are possible within the scope of the present invention without departing from the spirit and scope of the invention.

That which is claimed is:

1. A method of forming a flexible joint in a semi-rigid, solid plastic material which comprises as the sole formative step a repeated flexing of the material along a line forming the axis of desired flexibility so that there is formed along said line a reoriented necked-down portion.
2. The method of claim 1 wherein said flexing encompasses an arc of at least about 180°.
3. The method of claim 1 wherein said plastic material is polyethylene.

References Cited in the file of this patent

UNITED STATES PATENTS

| | | |
|---|---|---|
| 1,661,300 | Perpall | Mar. 6, 1928 |
| 1,850,059 | Bolton | Mar. 15, 1932 |
| 1,994,604 | Bohne | Mar. 19, 1935 |
| 2,276,536 | Cooper | Mar. 17, 1942 |
| 2,331,512 | Siedschlag | Oct. 12, 1943 |
| 2,526,129 | Groesbeck | Oct. 17, 1950 |
| 2,554,001 | Beal | May 22, 1951 |
| 2,592,411 | Frolinapel | Apr. 8, 1952 |
| 2,606,398 | Miller | Aug. 12, 1952 |
| 2,607,411 | Van Vliet | Aug. 19, 1952 |
| 2,746,087 | Dolezal | May 22, 1956 |
| 2,770,298 | Hiatt | Nov. 13, 1956 |
| 2,812,023 | Laity | Nov. 5, 1957 |